July 20, 1965 A. M. BRENNEKE 3,195,905
PISTON RING ASSEMBLY
Filed Oct. 6, 1958 4 Sheets-Sheet 1
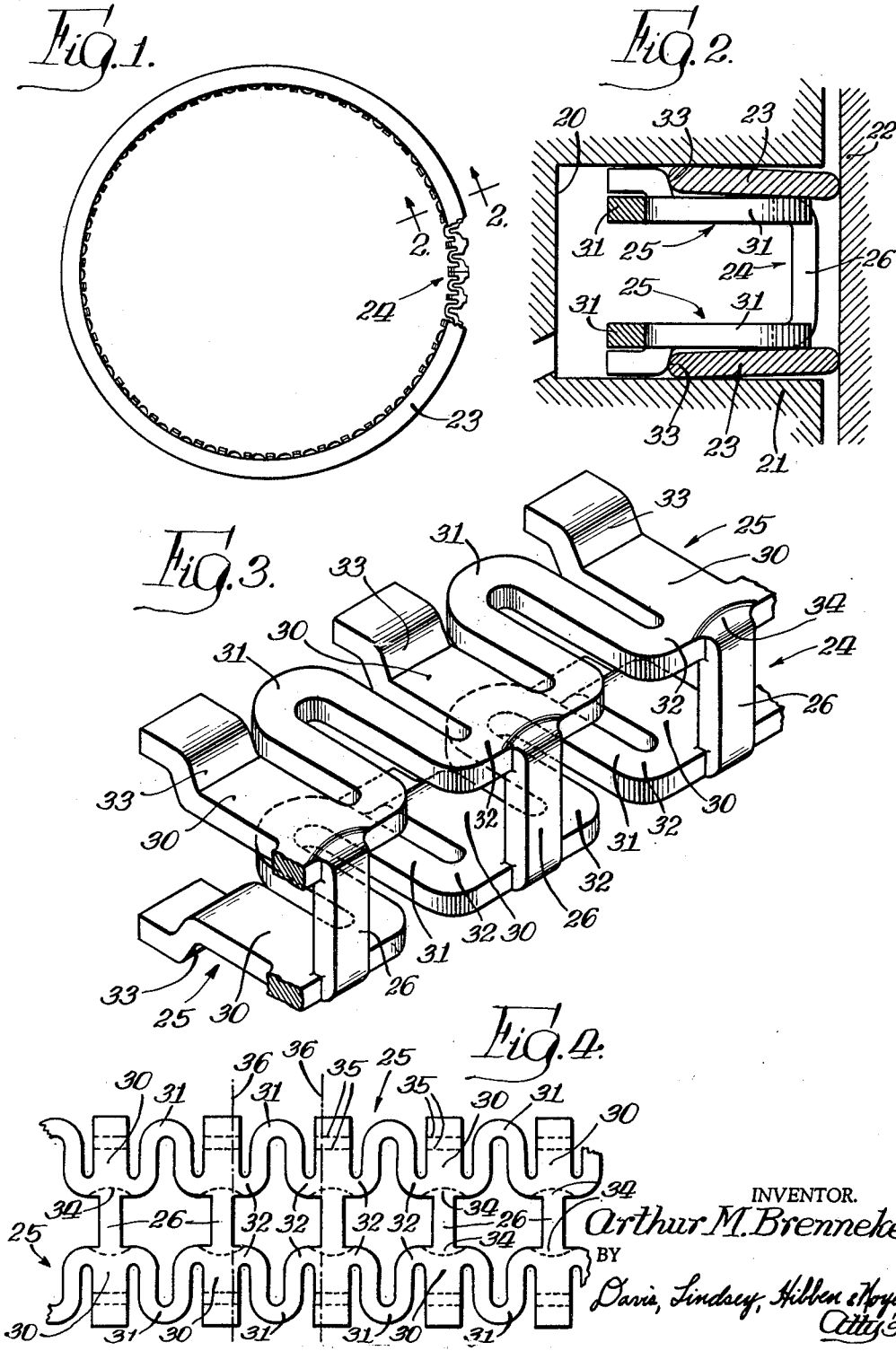
INVENTOR.
Arthur M. Brenneke,
BY
Davis, Lindsey, Hibben & Noyes
Attys.

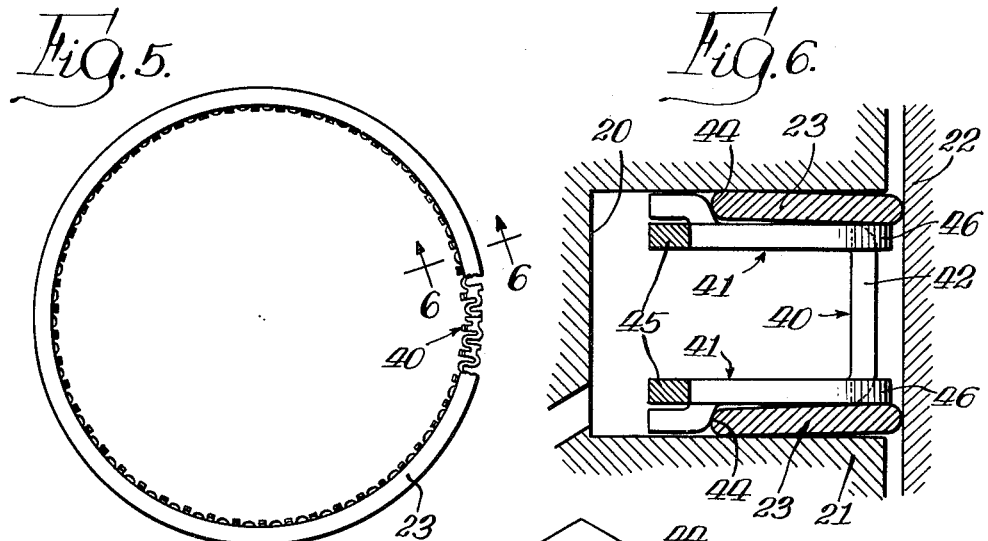
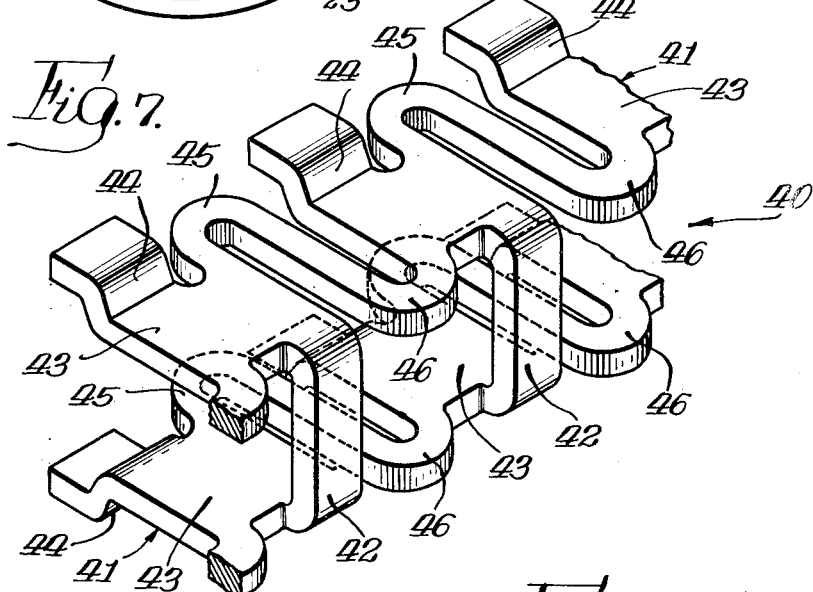
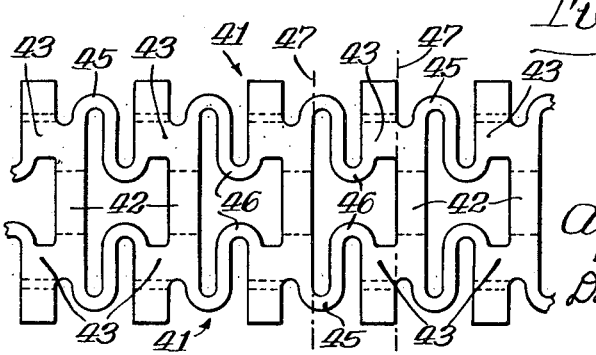

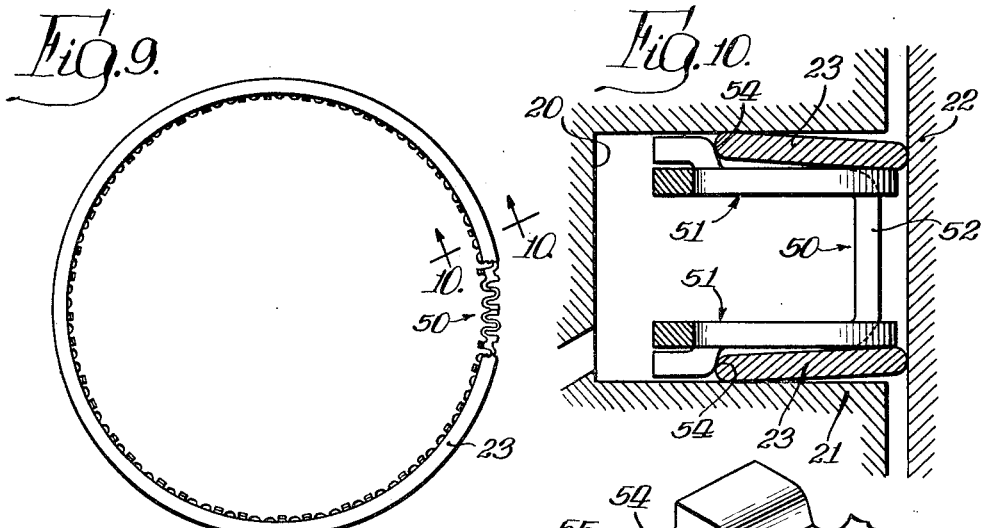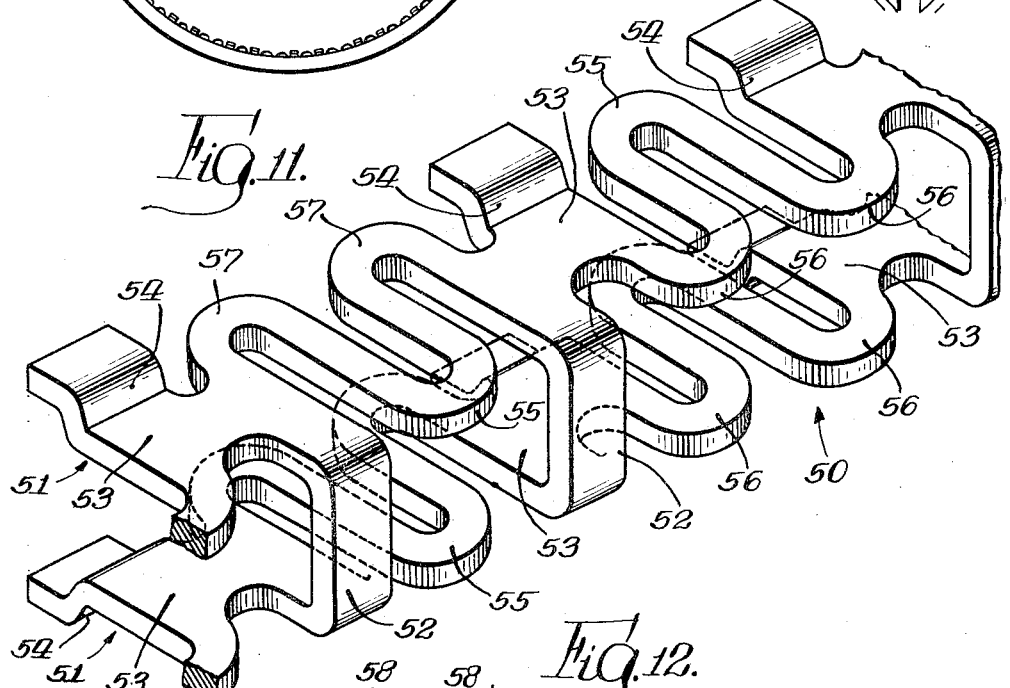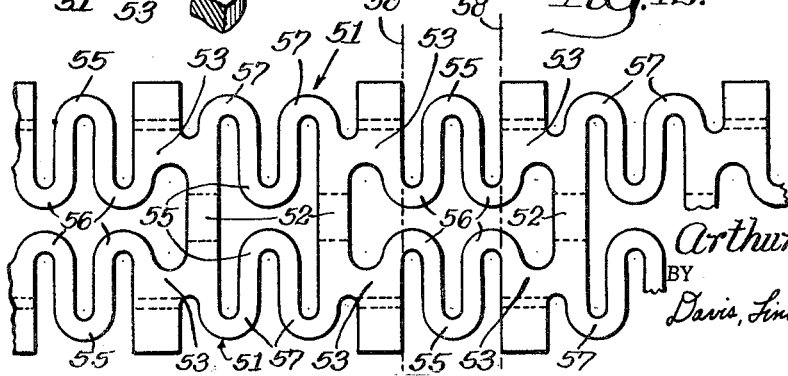

July 20, 1965  A. M. BRENNEKE  3,195,905
PISTON RING ASSEMBLY
Filed Oct. 6, 1958  4 Sheets-Sheet 4
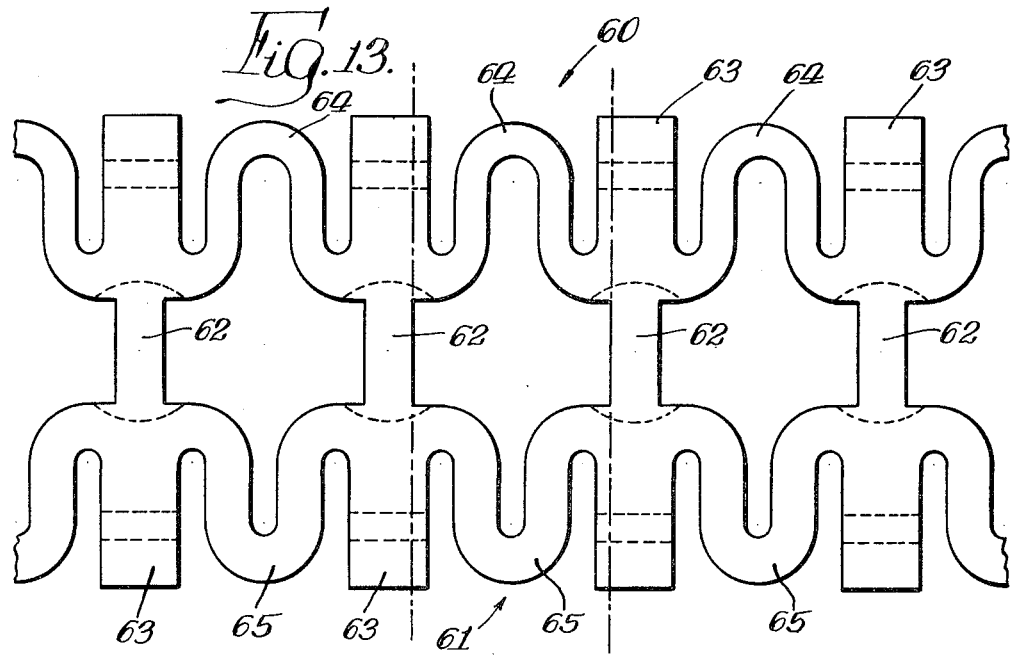
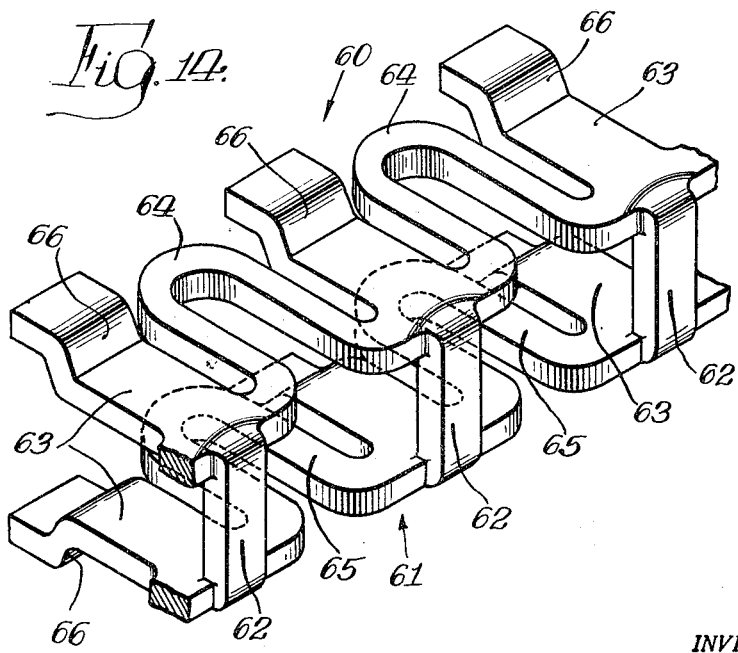
INVENTOR.
Arthur M. Brenneke
BY
Davis, Lindsey, Hibben & Noyes
Attys.

United States Patent Office 3,195,905
Patented July 20, 1965

3,195,905
PISTON RING ASSEMBLY
Arthur M. Brenneke, Hagerstown, Ind., assignor, by mesne assignments, to Perfect Circle Corporation, Hagerstown, Ind., a corporation of Indiana
Filed Oct. 6, 1958, Ser. No. 765,632
42 Claims. (Cl. 277—140)

The invention relates generally to piston rings and more particularly to an oil ring assembly.

The general object of the invention is to provide a novel piston ring assembly comprising one or more rails, and positioning and expanding means for the rail or rails, having a structure that provides for free flow of oil therethrough without clogging.

Another object is to provide a novel spacer-expander for a piston ring assembly having a pair of rails, which exerts a relatively high load on the rails and yet is so constructed as to provide relatively large radial openings avoiding any tendency to clog.

It is also an important object of the invention to provide a novel spacer-expander for a pair of rails, which is so constructed that each side of the spacer-expander exerts an outward pressure on its associated rail independently of the pressure exerted against the other rail.

A further object is to provide a novel spacer-expander for a pair of rails, the two sides of the spacer-expander comprising independently functioning spring structures constructed to exert different outward pressures on the respective rails.

Still another object is to provide a novel spacer-expander for a pair of rails, which comprises axially extending struts and radially extending flanges extending inwardly from the respective ends of the struts to hold the rails axially spaced, the flanges having portions extending outwardly beyond the struts to support the rails adjacent their outer peripheries, with the struts spaced inwardly a substantial distance from the cylinder wall.

A further object is to provide a novel spacer-expander having the foregoing features and which may be readily manufactured from sheet metal.

Other objects and advantages will become apparent from the following description, taken in connection with the accompanying drawings in which:

FIG. 1 is a plan view of a piston ring assembly embodying the features of the invention, with a portion broken away;

FIG. 2 is an enlarged sectional view taken on the line 2—2 of FIG. 1 and showing the ring assembly mounted in a piston and cylinder;

FIG. 3 is an enlarged fragmentary perspective view of the spacer-expander forming part of the ring assembly shown in FIGS. 1 and 2;

FIG. 4 is an enlarged fragmentary view of a strip of sheet metal punched in a manner to form the spacer-expander shown in FIG. 3;

FIGS. 5, 6, 7 and 8 are views respectively similar to FIGS. 1, 2, 3 and 4 but showing a modified form of ring assembly;

FIGS. 9, 10 11 and 12 are views respectively similar to FIGS. 1, 2, 3 and 4 but showing another modified form of ring assembly;

FIG. 13 is an enlarged fragmentary view of a strip of sheet metal punched in a different manner from that shown in FIG. 4 to form a spacer-expander for still another modified form of ring assembly; and FIG. 14 is an enlarged fragmentary perspective view of the spacer-expander made from the strip shown in FIG. 13.

A ring assembly embodying the features of the invention is adapted for use as an oil ring on a piston of an internal combustion engine. The ring assembly is of the type comprising a circumferentially expansible spacer-expander and a pair of cylinder-engaging rails, the spacer-expander holding the rails axially spaced adjacent the respective sides of the groove in the piston and engaging the inner peripheries of the rails to force them against the cylinder wall under pressure.

In some ring assemblies of this general type, difficulty is sometimes encountered from clogging of the spacer-expander. Such clogging prevents the spacer-expander from functioning properly so that the rails are not held against the cylinder wall with the desired pressure. The clogging also prevents free flow of oil inwardly through the spacer-expander, as it is scraped from the cylinder wall by the rails. When it is desired to provide a ring assembly having a high tangential tension or load, the spacer-expander of the type heretofore commonly used requires increased dimensions for portions thereof and the openings through the spacer-expander are thereby decreased, with a consequent increase in clogging. The problem is thus accentuated with ring assemblies having a high tangential tension or load.

In ring assemblies as heretofore constructed, the spring action of the spacer-expander was applied equally to the two rails. In other words, the spacer-expander had a single spring structure which acted equally on the two rails. If clogging affected the action of the spacer-expander, the pressure on both rails was thus affected. Spring structures of this character also extended through the space between the rails so that they necessarily prevented large openings for the free flow of oil.

A ring assembly embodying the features of the invention includes a spacer-expander having a pair of spring structures which function independently of each other and independently exert pressure on the respective rails. The two spring structures are located adjacent the respective rails to support them axially and are connected to each other solely by axially extending struts. The struts thus may be so dimensioned and so spaced from one another that large openings through the spacer-expander are provided and clogging is prevented. The struts do not exert any spring load so that their dimensioning and spacing is determined chiefly by the size of openings desired therebetween. The spring structures, however, may be dimensioned to exert the desired load on the rails.

In different engines, different problems of cylinder lubrication may arise, or unusual and unexpected wear may occur on one rail more than on the other. It therefore may be desirable in certain instances to exert a greater spring pressure on one rail than on the other rail.

The spacer-expander in each of the four embodiments disclosed herein, is made of sheet metal, a strip of such metal being punched or cut to provide the spring structures and struts and then bent along longitudinally extending lines to provide a generally U-shape cross section. When so formed, the strip may be given a circular shape and cut to the desired length. When the spaced-expander is placed in its groove in the piston in association with the rails, its. ends are in abutment with one another so that it tends to expand circumferentially when in a cylinder. The spring structures include both spring elements and rail-supporting members, the latter pushing outwardly on the rails so that wear on the spring elements is avoided.

One embodiment of the invention is shown in FIGS. 1 to 4, and in FIG. 2 this embodiment is shown mounted in a groove 20 in a piston shown fragmentarily at 21, the piston being located in a cylinder fragmentarily shown at 22. The ring assembly of this embodiment comprises a pair of cylinder-engaging rails 23 and a spacer-expander indicated generally at 24. The rails 23 are of the type usually used in ring assemblies of this general character and are shown as having rounded edges.

The spacer-expander 24 comprises a pair of flat spring structures, each indicated generally at 25, which are axially spaced from each other to hold the rails 23 adjacent the respective sides of the groove 20. The two spring structures 25 are held in such spaced relation by a plurality of circumferentially spaced axially extending struts 26 integrally connected to and located at the outer periphery of the spring structures. The spring structures 25 function independently of each other and, in addition to holding the rails adjacent the respective sides of the groove, are provided with means engaging the inner peripheries of the rails to force them outwardly against the cylinder wall with the desired pressure.

Each spring structure 25 comprises a set of radially extending rail-supporting members 30 integrally connected at their outer end to, and radially aligned with, the struts 26. Circumferentially connecting the members 30 are a plurality of spring elements 31 which lie in the same plane with the associated set of rail-supporting members 30. In this embodiment, the spring elements are U-shaped and open outwardly, the ends of the arms of the U being turned outwardly of the U and circumferentially of the ring, as shown at 32, and integrally connected to the members 30 adjacent the outer ends thereof. The members 30 are provided with means for engaging the inner periphery of the associated rails 23. Thus, each member 30, adjacent its inner end, is bent axially and then inwardly to provide an outwardly facing shoulder 33 adapted to abut the inner periphery of the rail to force it outwardly. The shoulder 33 is preferably at a small angle to an axially extending line to provide a component of force urging the inner plurality of the rail against the side of the groove to form a seal therewith. The inner portion of each member 30 extends inwardly from the shoulder 33 sufficiently to give the ring assembly sufficient radial width to prevent the rails from slipping out of the groove when the piston is being inserted into the cylinder.

The spacer-expander 24 is formed from a strip of sheet metal punched or cut as shown in FIG. 4. The strip is then formed into a cross-sectional U shape by bending at the dotted lines 34 where the members 30 are connected to the struts 26. To form the shoulder 33, the members 30 are bent on lines indicated by the dotted lines 35. When the formed strip is cut into a length sufficient to form a ring of a desired diameter, such cut is made at a point in the ring where a maximum end surface is obtained so that the ends of the spacer-expander when in abutment will have full bearing against each other. In the present instance, such cuts are made on transverse lines indicated by the dash-and-dot lines 36 in FIG. 4.

In the modified embodiment shown in FIGS. 5 to 8, a spacer-expander, indicated generally at 40, is shown, which is similar to the spacer-expander 24. Thus, the spacer-expander 40 comprises a pair of independently functioning flat spring structures, each indicated generally at 41, connected by axially extending struts 42 at the outer periphery of the spacer-expander. Each spring structure 41 comprises a set of rail-supporting members 43, each having a portion radially aligned with and integrally connected to a strut 42, and a circumferentially offset portion having means, in the form of a shoulder 44, adjacent its inner end to engage the inner periphery of the associated rail 23 to force it outwardly, the shoulder 44 being at a small angle to an axially extending line to provide a component of force urging the inner periphery of the rail against the side of the groove to form a seal therewith.

The rail-supporting members 43 are connected by U-shaped springs 45. Thus, each spring 45 has one of its arms connected to the inner end of the portion of one member 43, that is aligned with the strut 42, and the other arm of the U is reversely formed, as at 46, and connected to the outer end of the cricumferentially offset portion of an adjacent member 43. The reversely formed portions 46 project radially outward beyond the struts 42 to support the rails adjacent their outer peripheries to decrease the vibration of the rails, the struts 42 being spaced from the cylinder wall a substantial distance, such spacing avoiding a tendency to clog.

The spacer-expander 40 is made from an elongated strip of sheet metal, similarly to the first-described form of spacer-expander. Thus, the strip is punched or cut as shown in FIG. 8 and is bent on longitudinally extending lines, illustrated by the dotted lines in FIG. 8, resulting in the structure shown in FIG. 7. It is then formed into a circle and cut to the desired length, the cuts being made on the dash-and-dot lines 47 (see FIG. 8) for purposes hereinbefore described in connection with the first form of spacer-expander.

FIGS. 9 to 12 show another modified form of spacer-expander indicated generally at 50, comprising a pair of axially spaced, flat, independently fuctioning spring structures, each indicated generally at 51. The two spring structures 51 are integrally connected adjacent the outer periphery of the spacer-expander by axially extending struts 52. Each spring structure 51 comprises a set of rail-supporting members 53, each having a portion radially aligned with and integrally connected to a strut 52, and a circumferentially offset portion having means, in the form of a shoulder 54, adjacent its inner end to engage the inner periphery of the associated rail 23 to force it outwardly, the shoulder 54 being at a small angle to an axially extending line to provide a component of force urging the inner periphery of the rail against the side of the groove to form a seal therewith. The two portions of each member 53 are in reversed or opposite relation to the two portions of the next adjacent members 53.

The rail-supporting members 53 are connected by U-shaped springs 55 lying in the same plane with the members 53. The springs 55 open alternately inwardly and outwardly. The ends of the arms of each spring 55 are outwardly and reversely formed to connect them to the members 53. Thus, each spring 55 that opens outwardly has reversely formed ends 56 which are connected to the outer ends of the circumferentially offset portions of the two adjacent members 53, while each spring 55 that opens inwardly has reversely formed ends 57 which are connected to the inner ends of the portions of two adjacent members 55, that are aligned with the struts 52. The base portions of the inwardly opening members 55 and the reversely formed ends 56 of the arms of the outwardly opening members 55 project radially outward beyond the struts 52 to support the rails adjacent their outer peripheries to decrease the vibration of the rails, the struts 52 being spaced from the cylinder wall to avoid a tendency to cause clogging.

The spacer-expander 50 is made from an elongated strip of sheet metal cut or punched as shown in FIG. 12, similarly to the other forms, the strip being folded on longitudinally extending lines to a U-shaped form, and then formed into a circle and cut to the desired length, the cuts to form the ends being located at the dash-and-dot lines 58 shown in FIG. 12.

In each of the three embodiments of the invention heretofore described, the two spring structures at the respective sides of the spacer-expander are dimensioned so that they exert equal pressures on the respective rails. In some engines it may be found desirable, because of conditions of cylinder lubrication or because of unusual or unexpected wear on one of the rails or for some other reason, to so construct the respective spring structures that they exert different pressures on the respective rails. In FIGS. 13 and 14, there is illustrated a spacer-expander formed by similar punching to that used in forming the spacer-expander 24 shown in FIGS. 1 to 4, but with the spacer-expander of FIGS. 13 and 14 different pressures are exerted against the respective rails.

Thus, the spacer-expander shown in FIGS. 13 and 14 comprises a pair of flat spring structures indicated generally at 60 and 61 connected by struts 62. Each spring structure 60 and 61 comprises a set of radial extending rail-supporting members 63 integrally connected at their outer ends to, and radially aligned with, the struts 62. Circumferentially connecting the members 63 in the spring structure 60 are a plurality of U-shaped spring elements 64, and circumferentially connecting the members 63 of the spring structure 61 are a plurality of U-shaped spring elements 65. The members 63, in both spring structures, are bent to provide outwardly facing shoulders 66 adapted to bear against and exert pressures on the inner peripheries of the rails in the same manner as the shoulders 33 in the form of FIGS. 1 to 4.

The two spring structures 60 and 61 are constructed to exert different pressures on the rails associated therewith. For purposes of illustration, the upper spring structure 60 is shown as being somewhat weaker than the lower spring structure 61, and the upper spring structure 60 thus exerts a somewhat smaller pressure on its associated rail than that exerted by the lower spring structure 61 on its associated rail. To this end, the arms of the U-shaped spring elements 64 of the upper spring structure 60 are narrower in cross-section than the arms of the U-shaped spring elements 65 of the lower spring structure 61. Such difference in width may be easily obtained in the punching operation in forming the strip shown in FIG. 13 With such difference in width, the spring structure 60 will exert less pressure on its associated rail than will the spring structure 61.

While, in FIGS. 13 and 14, the upper spring structure 60 is shown as being the weaker one, it may be desirable for some engines to provide a spacer-expander in which the lower spring structure 61 is the weaker of the two. It is apparent that the spring structures of the spacer-expanders shown in FIGS. 5 to 8 and in FIGS. 9 to 12 could similarly be formed to provide different pressures.

From the foregoing description, it will be apparent that I have provided a ring assembly including a spacer-expander having a pair of axially spaced spring structures functioning independently of each other so that the rails are independently urged outwardly against the cylinder wall. The two spring structures are connected solely by circumferentially spaced struts, the latter being so dimensioned and so spaced from one another that the openings through the spacer-expander are large and clogging is prevented. The struts, since they carry no spring load, may be relatively narrow, while the spring structures may be dimensioned to provide the desired tension without affecting the size of the struts. The two spring structures may also be constructed so that they exert different pressures on the respective rails.

I claim:

1. A piston ring assembly comprising a pair of cylinder-engaging rails, and a spacer-expander for holding the rails axially spaced and for forcing the rails outwardly, said spacer-expander comprising a pair of independently functioning unitary circumferentially expansible axially spaced annular spring structures bearing axially and oppositely against the respective rails and having means engaging the inner peripheries of the rails for forcing them outwardly, and axially extending struts integrally connecting said spring structures, said means also exerting an axial force on the rails for forcing the rails at their inner peripheries against the sides of the groove to form a seal therewith.

2. A piston ring assembly comprising a pair of cylinder-engaging rails, and a spacer-expander for holding the rails axially spaced and for forcing the rails outwardly, said spacer-expander comprising a plurality of circumferentially spaced axially extending struts, two sets of rail-supporting members integrally connected to said struts at the respective ends thereof and having means at their inner ends engaging the inner peripheries of the rails for forcing them outwardly, the rail-supporting members of each set being circumferentially spaced from each other, and spring elements integrally connecting said members in each set and located in the spaces between said members.

3. A piston ring assembly according to claim 2, in which said spring elements are U-shaped.

4. A piston ring assembly according to claim 2, in which the spring elements of each set lie in the same plane with said members of the set.

5. A piston ring assembly comprising a pair of cylinder-engaging rails, and a spacer-expander for holding the rails axially spaced and for forcing the rails outwardly, said spacer-expander comprising a plurality of circumferentially spaced axially extending struts, two sets of rail-supporting members extending radially from the respective ends of said struts, said members having means at their inner ends for forcing the rails outwardly, the rail-supporting members in each set being circumferentially spaced from each other, and spring elements connected directly to the members in each set and located in the spaces between said members.

6. A piston ring assembly according to claim 5, in which each spring element is U-shaped and has the ends of its arms respectively connected to members on opposite sides thereof.

7. A piston ring assembly according to claim 6, in which the U-shape opens outwardly and the ends of the arms are connected to the members adjacent the outer ends of the latter.

8. A piston ring assembly comprising a pair of cylinder-engaging rails, and a spacer-expander for holding the rails axially spaced and for forcing the rails outwardly, said spacer-expander comprising a plurality of circumferentially spaced axially extending struts, two sets of rail-supporting members integrally connected to said struts at the respective ends thereof and extending inward, each member comprising a portion radially aligned with its associated strut and a circumferentially offset portion having means adjacent its inner end engaging the inner periphery of one of the rails to force it outwardly, and spring elements connecting the rail-supporting members in each set.

9. A piston ring assembly according to claim 8, in which each spring element is connected to the first-mentioned portion of one member and to the second-mentioned portion of another member.

10. A piston ring assembly comprising a pair of cylinder-engaging rails, and a spacer-expander for holding the rails axially spaced and for forcing the rails outwardly, said spacer-expander comprising a plurality of circumferentially spaced axially extending struts, two sets of rail-supporting members integrally connected to said struts at the respective ends thereof and extending radially inward, each member having means engaging the inner periphery of one of the rails to force it outwardly, and alternate inwardly opening and outwardly opening U-shaped spring elements connecting the rail-supporting members of each set.

11. A piston ring assembly comprising a pair of cylinder-engaging rails, and a spacer-expander for holding the rails axially spaced and for forcing the rails outwardly, said spacer-expander comprising a plurality of circumferentially spaced axially extending struts, two sets of rail-supporting members integrally connected to said struts at the respective ends thereof and extending radially inward, each member comprising a portion radially aligned with its associated strut and a circumferentially offset portion having means adjacent its inner end engaging the inner periphery of one of the rails to force it outwardly, and U-shaped spring elements having their ends reversely formed, the spring elements being connected by their reversely formed ends alternately to the first-mentioned portions and to the second-mentioned portions.

12. A piston ring assembly comprising a pair of cylinder-engaging rails, and a spacer-expander for holding the rails axially spaced and for forcing the rails outwardly, said spacer-expander comprising a pair of axially spaced independently functioning spring structures, and axially extending struts connecting the spring structures adjacent the outer periphery thereof, said spring structures having portions extending outwardly beyond said struts to support rails adjacent their outer peripheries.

13. A piston ring assembly comprising a pair of cylinder-engaging rails, and a unitary circumferentially expansible spacer-expander holding the rails axially spaced and integrally including axially spaced spring means constructed to exert different outward pressures on the respective rails.

14. A piston ring assembly according to claim 13, in which said spring means comprises a pair of independently functioning spring structures of different strengths.

15. A piston ring assembly comprising a pair of cylinder-engaging rails, and a spacer-expander comprising a pair of axially spaced independently functioning spring structures for holding the rails axially spaced and for forcing the rails outwardly, and axially extending struts connecting the spring structures and holding them axially spaced, said spring structures having different strengths and thereby exerting different pressures on the respective rails.

16. A piston ring assembly according to claim 15, in which each spring structure includes a plurality of spring elements, the spring elements of one spring structure being of different cross-sectional width from the spring elements of the other spring structure.

17. A piston ring assembly according to claim 15, in which each spring elements is U-shape, and in which the arms of the U-shaped spring elements of one spring structure are of different cross-sectional width from the arms of the U-shaped spring elements of the other spring structure.

18. A spacer-expander for a piston ring assembly including a pair of rails, comprising a pair of axially spaced independently functioning circumferentially expansible unitary annular flat spring structures, and axially extending struts connecting said spring structures, each spring including axially extending means at its inner periphery adapted to engage the inner periphery of the associated rail, said means exerting a radial force for forcing the rails outwardly and an axial force for forcing the rails against the sides of the groove.

19. A spacer-expander for a piston ring assembly including a pair of rails, comprising a pair of axially spaced independently functioning unitary annular spring structures, and axially extending struts connecting said spring structures, each spring structure comprising a plurality of rail-engaging members, and a plurality of U-shaped spring elements connecting said members.

20. A spacer-expander according to claim 19, in which each U-shaped spring element has the ends of its arms respectively connected to two of said members.

21. A spacer-expander for a piston ring assembly including a pair of rails, comprising a pair of axially spaced independently functioning spring structures, and axially extending struts connecting said spring structures, each spring structure comprising a plurality of rail-engaging members extending radially inward from said struts, and a plurality of spring elements connected to said members adjacent the outer ends of the latter.

22. A spacer-expander for a piston ring assembly including a pair of rails, comprising a pair of axially spaced independently functioning spring structures, and axially extending struts connecting said spring structures, each spring structure comprising a plurality of rail-engaging members, and a plurality of outwardly opening U-shaped spring elements having the ends of the arms of each U turned circumferentially and connected to two of said members.

23. A spacer-expander for a piston ring assembly including a pair of rails, comprising a plurality of axially extending struts, and a pair of independently functioning spring structures connected to the respective ends of said struts for holding the rails spaced apart, each spring structure comprising a plurality of members extending radially inward, each member comprising a portion radially aligned with one of the struts and a circumferentially offset portion, and spring elements connecting said members.

24. A spacer-expander according to claim 23, in which said offset portions have means for engaging the inner periphery of a rail to force it radially outward.

25. A spacer-expander according to claim 23, in which each spring element is U-shaped with one arm of each U connected to the first-mentioned portion of one member and the other arm connected to the offset portion of another member.

26. A spacer-expander according to claim 25, in which one arm of each U is connected to the inner end of the first-mentioned portion of one member and the other arm of each U is connected to the outer end of the offset portion of another member.

27. A spacer-expander for a piston ring assembly including a pair of rails, comprising a plurality of axially extending struts, and a pair of independently functioning spring structures connected to the respective ends of said struts for holding the rails spaced apart, each spring structure comprising a plurality of members extending radially inward, each member comprising a portion radially aligned with one of the struts and a circumferentially offset portion, and spring elements connecting said members, in which said spring elements are U-shaped and have the ends of their arms reversely turned and connected to said members.

28. A spacer-expander according to claim 27, in which the reversely turned ends of alternate spring elements are connected to the inner ends of the first-mentioned portions of two members, and the reversely turned ends of the other spring elements are connected to the outer ends of the offset portions of two members.

29. A spacer-expander for a piston ring assembly including a pair of rails, comprising a plurality of axially extending struts, and a pair of independently functioning spring structures connected to the respective ends of said struts and extending inwardly therefrom for holding the rails spaced apart, each spring structure having portions extending outwardly beyond said struts to support the rails adjacent their outer peripheries.

30. A spacer-expander for a piston ring assembly including a pair of rails, comprising a pair of axially spaced independently functioning spring structures connected by axially extending struts, said spring structures having different strengths and adapted to exert different pressures on the respective rails.

31. A spacer-expander according to claim 30, in which each spring structure includes a plurality of spring elements, the spring elements of one spring structure being of different cross-sectional width from the spring elements of the other spring structure.

32. In a piston ring assembly which includes a pair of axially spaced rails, a combined spacer and expander element disposed between the rails and having flanges bearing outwardly against the inner peripheries of the rails, said element being of a unitary construction and consisting of axially spaced expansion rings each of which is comprised of a plurality of end-to-end circumferentially extending portions which are substantially identical, each of said portions being of an irregular shape and having return-curved sections so that it is expandable in a direction lengthwise thereof, said expansion rings being formed so that said irregularly shaped portions are arranged in matching pairs spaced axially of said rings, and connecting columns extending between said rings only at the ends of said portions.

33. A spacer-expander for a piston ring assembly including a pair of rails, comprising a plurality of axially extending struts, and a pair of independently functioning spring structures connected to the respective ends of said struts for holding the rails spaced apart, each spring structure comprising a plurality of members extending radially inward, each member comprising a portion radially aligned with one of the struts and a circumferentially offset portion, and spring elements connecting said members, in which said spring elements are U-shaped and open alternately inwardly and outwardly.

34. A piston ring assembly comprising a pair of cylinder-engaging rails, and a spacer-expander for holding the rails axially spaced and for forcing the rails outwardly, said spacer-expander comprising a pair of independently functioning unitary axially spaced annular spring structures and axially extending struts integrally connecting said spring structures adjacent the outer periphery of the spacer-expander.

35. A piston ring assembly comprising a pair of cylinder-engaging rails, and a spacer-expander for holding the rails axially spaced and for forcing the rails outwardly, said spacer-expander comprising a plurality of circumferentially spaced axially extending struts, and a pair of unitary annular flanges extending inwardly from the respective ends of said struts, each flange comprising an independently functioning spring structure.

36. A spacer-expander for a piston ring assembly including a pair of rails, comprising a pair of axially spaced independently functioning unitary annular spring structures, and axially extending struts connecting said spring structures, each spring structure comprising a plurality of circumferentially spaced rail-engaging members, and a plurality of spring elements located in the spaces between and connecting said members.

37. A circumferential expander and spacer ring for maintaining piston rail rings in sealing relation with a cylinder, said ring comprising a plurality of axially spaced generally U-shaped resilient leg segments and a plurality of axially spaced connecting portions therebetween, each of said segments being circumferentially spaced from the connecting portions by a generally U-shaped aperture opening in a direction opposite from the aperture in each of the leg segments, the leg segments and connecting portions being axially spaced by a web portion integral with one end of the connecting portions.

38. A piston ring having a pair of rails and an expander-spacer having a circular body, said body comprising radially extending spring elements each having radially extending legs and forming rail supporting seats, axially extending struts holding said spring elements in axially spaced relationship; circumferentially spaced tongue members integral with said body and having radially extending portions lying in the general plane of said spring elements; axially extending rail stops on the ends of said tongue members for engaging the inner periphery of said rails; the radial length of said tongue members being independent of the radial length of said spring elements.

39. A piston ring having a pair of rails and an expander-spacer therebetween, said expander-spacer having a circular body, said body having a plurality of circumferentially spaced axially extending struts and a plurality of generally U-shaped radially extending spring elements connecting together said struts and providing rail seats, said spring elements having radially extending legs; circumferentially spaced tongue members integral with said body and having a portion lying in the general plane of said spring elements, each of said portions being circumferentially spaced from adjacent ones of said legs; axially extending rail stops at the free ends of said tongue members for engaging the inner periphery of said rails, the radial length of said tongue members being independent of the radial length of said spring elements.

40. A piston ring having a pair of rails and an expander-spacer therebetween, said expander-spacer comprising: a plurality of circumferentially spaced axially extending struts; a plurality of radially extending generally U-shaped spring elements connecting together said struts and providing rail seats; said spring elements having radially projecting legs; tongue members integral with and projecting radially from said spring elements and having a portion lying in the general plane of said spring elements, said portions being circumferentially spaced from adjacent ones of said legs; and axially extending rail stops at the free ends of said tongue members for engaging the inner periphery of said rails; the radial length of said tongue members being independent of the radial length of said spring elements.

41. A piston ring having a pair of rails and an expander-spacer having a circular body, said body comprising radially extending spring elements each having radially extending legs and forming rail supporting seats, axially extending struts holding said spring elements in axially spaced relationship; circumferentially spaced tongue members integral with said spring elements and having radially extending portions lying in the general plane of said spring elements; axially extending rail stops on the ends of said tongue members for engaging the inner periphery of said rails; the radial length of said tongue members being independent of the radial length of said spring elements.

42. A piston ring having a pair of rails and an expander-spacer having a circular body, said body comprising: radially extending spring elements each having radially extending legs and forming rail supporting seats, axially extending struts holding said spring elements in axially spaced relationship; circumferentially spaced tongue members integral with said body and having radially extending portions lying in the general plane of said spring elements; said tongue members having axially extending portions forming rail stops for engaging the inner periphery of said rails; the radial length of said tongue members and the radial position of said rail stops being independent of the radial length of said spring elements.

References Cited by the Examiner
UNITED STATES PATENTS

| | | | |
|---|---|---|---|
| 2,587,888 | 3/52 | Phillips | 277—139 |
| 2,635,022 | 4/53 | Shirk | 277—140 |
| 2,830,861 | 4/58 | Marien | 309—45 |
| 2,837,385 | 6/58 | Mayfield | 277—140 |

EDWARD V. BENHAM, *Primary Examiner.*

KARL J. ALBRECHT, RALPH H. BRAUNER,
*Examiners.*

UNITED STATES PATENT OFFICE
CERTIFICATE OF CORRECTION

Patent No. 3,195,905                                      July 20, 19(

Arthur M. Brenneke

It is hereby certified that error appears in the above numbered patent requiring correction and that the said Letters Patent should read as corrected below.

Column 3, line 34, for "plurality" read -- periphery --.

Signed and sealed this 18th day of January 1966.

(SEAL)
Attest:

ERNEST W. SWIDER                                         EDWARD J. BRENNER
Attesting Officer                                               Commissioner of Patents